US012643445B2

(12) United States Patent
Seo et al.

(10) Patent No.: US 12,643,445 B2
(45) Date of Patent: Jun. 2, 2026

(54) ARMREST DEVICE FOR VEHICLE

(71) Applicants: Hyundai Motor Company, Seoul (KR); Kia Corporation, Seoul (KR)

(72) Inventors: Sang Man Seo, Hwaseong (KR); Sang Hyeok Yun, Suwon (KR); Jong Seok Han, Suwon (KR); Gil Ju Kim, Hwaseong (KR); Suk Won Hong, Bucheon (KR); Hyun Mok Kim, Seoul (KR); Byoung Su You, Siheung (KR); Ryu Seok Ko, Gwangmyeong (KR); Soon Man Jang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 222 days.

(21) Appl. No.: 18/414,027

(22) Filed: Jan. 16, 2024

(65) Prior Publication Data

US 2025/0058687 A1 Feb. 20, 2025

(30) Foreign Application Priority Data

Aug. 17, 2023 (KR) ........................ 10-2023-0107517

(51) Int. Cl.
| | |
|---|---|
| *B60N 2/75* | (2018.01) |
| *B60N 3/00* | (2006.01) |
| *B60N 3/10* | (2006.01) |
| *B60R 7/04* | (2006.01) |

(52) U.S. Cl.
CPC ............. *B60N 2/793* (2018.02); *B60N 3/002* (2013.01); *B60N 3/102* (2013.01); *B60R 7/043* (2013.01)

(58) Field of Classification Search
CPC ........ B60N 2/793; B60N 3/002; B60N 3/102; A47C 7/624; A47C 7/70
USPC .......................... 297/188.14, 188.15, 188.19
See application file for complete search history.

(56) References Cited

U.S. PATENT DOCUMENTS

| | | | | |
|---|---|---|---|---|
| 4,417,764 A | * | 11/1983 | Marcus .................. | B60N 2/793 297/188.17 |
| 5,232,262 A | * | 8/1993 | Tseng ........................ | A47C 7/54 297/188.17 |
| 5,562,331 A | * | 10/1996 | Spykerman ............ | B60N 2/793 297/DIG. 6 |
| 6,045,173 A | * | 4/2000 | Tiesler ...................... | B60R 7/04 296/153 |

(Continued)

FOREIGN PATENT DOCUMENTS

| | | |
|---|---|---|
| JP | 7232418 B2 | 3/2023 |
| KR | 10-1125971 B1 | 3/2012 |

(Continued)

*Primary Examiner* — Jose V Chen
(74) *Attorney, Agent, or Firm* — Fox Rothschild LLP

(57) ABSTRACT

An armrest device for a vehicle includes a tray module configured to provide a cup holder function, an article storage function, and a table function; a frame module configured to enclose a periphery of the tray module and coupled to a rear seat of the vehicle; and a cover module configured to cover the tray module. The armrest device enables implementation of an arm rest function for allowing a passenger to put an arm on an armrest, as well as the cup holder function, the article storage function, and the table function utilizing a first slide cover having no vertically-extending hole, and a second slide cover formed with a cup holder hole.

16 Claims, 13 Drawing Sheets

(56) References Cited

U.S. PATENT DOCUMENTS

| | | | | | |
|---|---|---|---|---|---|
| 7,029,049 | B2 * | 4/2006 | Rockafellow | | B60N 2/763 |
| | | | | | 296/1.09 |
| 7,077,468 | B2 * | 7/2006 | Maierholzner | | B60N 2/773 |
| | | | | | 220/348 |
| 7,114,772 | B2 * | 10/2006 | Kobayashi | | B60N 2/206 |
| | | | | | 297/188.14 |
| 7,192,070 | B2 * | 3/2007 | Radu | | B60N 2/773 |
| | | | | | 296/37.8 |
| 7,278,681 | B2 * | 10/2007 | Lilov | | B60N 2/793 |
| | | | | | 297/188.17 |
| 7,416,235 | B2 * | 8/2008 | Rajappa | | B60R 7/04 |
| | | | | | 296/37.8 |
| 7,641,284 | B2 * | 1/2010 | Jones | | B60N 2/75 |
| | | | | | 297/115 |
| 7,954,663 | B2 * | 6/2011 | DePue | | B60R 7/04 |
| | | | | | 296/153 |
| 8,196,985 | B2 * | 6/2012 | Penner | | B60R 7/04 |
| | | | | | 296/24.34 |
| 8,235,442 | B2 * | 8/2012 | Spitler | | B60R 7/04 |
| | | | | | 296/37.8 |
| 8,540,310 | B2 | 9/2013 | Suhre | | |
| 8,911,011 | B2 * | 12/2014 | Andersson | | B60N 2/79 |
| | | | | | 297/188.17 |
| 10,428,864 | B2 * | 10/2019 | Bozio | | F16C 13/006 |
| 10,457,170 | B2 * | 10/2019 | Line | | B60N 3/004 |
| 10,562,423 | B2 * | 2/2020 | Vander Sluis | | F16F 1/376 |
| 2002/0089217 | A1 * | 7/2002 | Scheerhorn | | B60R 7/04 |
| | | | | | 297/188.19 |
| 2007/0262632 | A1 * | 11/2007 | Cody | | B60N 2/793 |
| | | | | | 297/411.35 |
| 2008/0079279 | A1 * | 4/2008 | Spykerman | | B60R 7/04 |
| | | | | | 296/24.34 |
| 2013/0082492 | A1 * | 4/2013 | Andersson | | B60N 3/108 |
| | | | | | 297/188.17 |
| 2016/0355110 | A1 * | 12/2016 | Bozio | | B60N 2/793 |
| 2019/0315258 | A1 * | 10/2019 | Johns | | E05D 3/125 |
| 2020/0113337 | A1 * | 4/2020 | Liu | | A47C 7/624 |
| 2022/0194283 | A1 * | 6/2022 | Sera | | B60N 2/793 |
| 2022/0274530 | A1 * | 9/2022 | Thomas | | B60R 7/04 |
| 2022/0340067 | A1 * | 10/2022 | Sang | | B60N 2/79 |
| 2023/0039884 | A1 * | 2/2023 | Dessapt | | H02J 7/0042 |
| 2024/0190316 | A1 * | 6/2024 | Hong | | B60N 3/101 |
| 2024/0424993 | A1 * | 12/2024 | Nomoto | | B60N 3/001 |
| 2025/0042319 | A1 * | 2/2025 | Jones | | B60N 3/005 |

FOREIGN PATENT DOCUMENTS

| | | | | |
|---|---|---|---|---|
| KR | 10-2014-0082341 A | | 7/2014 | |
| KR | 20210149525 A | * | 12/2021 | B60N 2/763 |

* cited by examiner

ARMREST DEVICE FOR VEHICLE

CROSS-REFERENCE TO RELATED APPLICATION

This application claims under 35 U.S.C. § 119 (a) the benefit of Korean Patent Application No. 10-2023-0107517 filed on Aug. 17, 2023 in the Korean Intellectual Property Office, the entire contents of which are incorporated herein by reference.

BACKGROUND

1. Technical Field

The present disclosure relates to an armrest device for a vehicle, more particularly, to the armrest device applied to a rear seat of the vehicle and configured to provide an armrest, a cup holder function, and an article storage function.

2. Description of the Related Art

Generally, an armrest usable by a passenger is provided at a second-row seat (a rear seat) of a passenger vehicle.

When the armrest of the rear seat is unfolded through forward rotation thereof such that the armrest protrudes forwards, the passenger may use the armrest for desired application. On the other hand, when the armrest is folded through rearward rotation thereof such that the armrest is vertically erected, the armrest is inserted into an armrest board, for storage thereof.

The armrest basically provides an arm rest function for allowing a passenger to put an arm thereon, a cup holder function, and an article storage function.

For example, when the armrest has a structure in which a cup holder is provided at a front portion of the armrest in a fixed state, and an article storage space is provided in rear of the cup holder, there is a drawback in that the article storage space using a tray is reduced by the space occupied by the cup holder.

In addition, there is a drawback in that it is impossible to use an upper surface of the armrest for a large-area table. For this reason, there may be a drawback in that use of the armrest is limited.

Furthermore, a frame structure constituting a skeleton of the armrest has a large number of elements. For this reason, there are drawbacks of an increase in weight and an increase in costs.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure provides an armrest device for a vehicle applied to a rear seat and configured to provide an arm rest function (e.g., for allowing a passenger to put an arm on an armrest), a cup holder function, and an article storage function, the armrest device being configured such that, when the cup holder function is not used, an upper surface of an armrest is covered by a cover, to be used as a table having a large area, thereby being capable of achieving an enhancement in the arm rest function for allowing the passenger to put an arm on the armrest or enabling the armrest to be used for laying of various articles thereon and, as such, achieving enhancements in convenience and marketability.

It is another object of the present disclosure to provide an armrest device for a vehicle applied to a rear seat and configured to provide an increased article storage space through use of a large tray space provided irrespective of use of a cup holder function, thereby being capable of achieving an enhancement in marketability.

It is another object of the present disclosure to provide an armrest device for a vehicle applied to a rear seat, which is capable of achieving a reduction in weight and a reduction in costs through a reduction in the number of elements of a frame structure constituting a skeleton of an armrest.

Objects of the present disclosure are not limited to the above-described objects, and other objects of the present disclosure not yet described will be more clearly understood by those skilled in the art from the following detailed description.

In accordance with an aspect of the present disclosure, the above and other objects can be accomplished by the provision of an armrest device for a vehicle including a tray module having a box structure, to provide a cup holder function, an article storage function, and a table function, a frame module configured to enclose a periphery of the tray module and coupled to a rear seat at opposite ends thereof, and a cover module configured to cover the tray module.

The tray module may include a tray provided with a storage space, a tray cover coupled to the tray and formed with a connecting window connected to the storage space, and a plurality of slide covers slidably coupled to the tray cover and configured to implement one of complete opening, partial opening, or closing of the connecting window in accordance with slide movement thereof and to provide a cup holder function upon partially opening the connecting window.

The slide cover may include a first slide cover having no hole extending vertically therethrough, to completely close the connecting window, and a second slide cover formed with a cup holder hole, to provide a cup holder function.

The first slide cover may be installed to be overlapped with the second slide cover over the second slide cover. A first guide rail and a second guide rail are formed at the tray cover along lateral edges of the connecting window, to extend forwards and rearwards while vertically overlapping each other. A first guide protrusion formed at a side surface of the first slide cover may be inserted into the first guide rail. A second guide protrusion formed at a side surface of the second slide cover may be inserted into the second guide rail.

A first manipulation protrusion may be formed at a front end of the first slide cover, to protrude upwards. A second manipulation protrusion may be formed at a front end of the second slide cover, to protrude upwards. The second manipulation protrusion may be formed to have a smaller lateral length than a lateral length of the first manipulation protrusion, to overlap with only a portion of the first manipulation protrusion under the first manipulation protrusion.

When the first slide cover is moved in a rearward direction under a condition that the connecting window is closed by the first slide cover, only the first slide cover may be moved in the rearward direction, the second slide cover may be exposed without being moved in the rearward direction, and the connecting window may be partially opened by the cup holder hole of the second slide cover, to enable a cup holder function to be implemented by the second slide cover.

When the second slide cover is moved in a rearward direction under a condition that the connecting window is closed by the first slide cover, the first slide cover may be moved in the rearward direction, together with the second slide cover, to completely open the connecting window and to enable implementation of a function for storing an article in the storage space of the tray through the opened connecting window.

When the first slide cover is moved in a forward direction under a condition that the connecting window is completely opened in accordance with rearward movement of both the first slide cover and the second slide cover, the second slide cover may be moved in the forward direction, together with the first slide cover, to completely close the connecting window.

When the second slide cover is moved in a forward direction under a condition that the connecting window is completely opened in accordance with rearward movement of both the first slide cover and the second slide cover, only the second slide cover may be exposed in accordance with forward movement thereof, and the connecting window may be partially opened by the cup holder hole of the second slide cover, to enable a cup holder function to be implemented by the second slide cover.

An upper surface of the armrest device may have a large area under a condition that the connecting window is completely closed by the first slide cover, to enable implementation of a table function.

The tray cover may be provided with a cover accommodating space configured to accommodate the first slide cover and the second slide cover.

The frame module may include a main pipe configured to enclose the periphery of the tray module, to support the tray module, hinge brackets respectively coupled to opposite ends of the main pipe, and hinge pins coupled to the rear seat while extending through the hinge brackets, respectively.

The cover module may include a cover part configured to cover a lower portion of the tray module and front, rear, left and right edges of the tray module as well as the frame module, and a cushion part connected to a rear portion of an upper end of the cover part, to provide cushioning to a passenger when the passenger puts an arm thereon.

The armrest device according to the embodiment of the present disclosure includes the first slide cover, which has a structure having no vertically-extending hole, and the second slide cover formed with the cup holder hole, and, as such, may implement an arm rest function enabling the passenger to put an arm thereon, a cup holder function, an article storage function, and a table function through movement of the first slide cover and the second slide cover. Accordingly, the armrest device according to the embodiment of the present disclosure has effects in that an enhancement in use convenience and an enhancement in marketability may be achieved.

In addition, the armrest device according to the embodiment of the present disclosure is configured to provide an increased article storage space through use of the large storage space of the tray, irrespective of use of the cup holder function. Accordingly, the armrest device according to the embodiment of the present disclosure has an effect in that an enhancement in marketability may be achieved.

Furthermore, the armrest device according to the embodiment of the present disclosure has effects in that a reduction in weight and a reduction in costs may be achieved through a reduction in the number of elements of the frame module constituting a skeleton of the armrest device.

A vehicle seat (e.g., a rear seat of the vehicle) may include the above-described armrest device.

A vehicle may include the above-described armrest device.

Effects attainable in the present disclosure are not limited to the above-described effects, and other effects of the present disclosure not yet described will be more clearly understood by those skilled in the art from the following description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
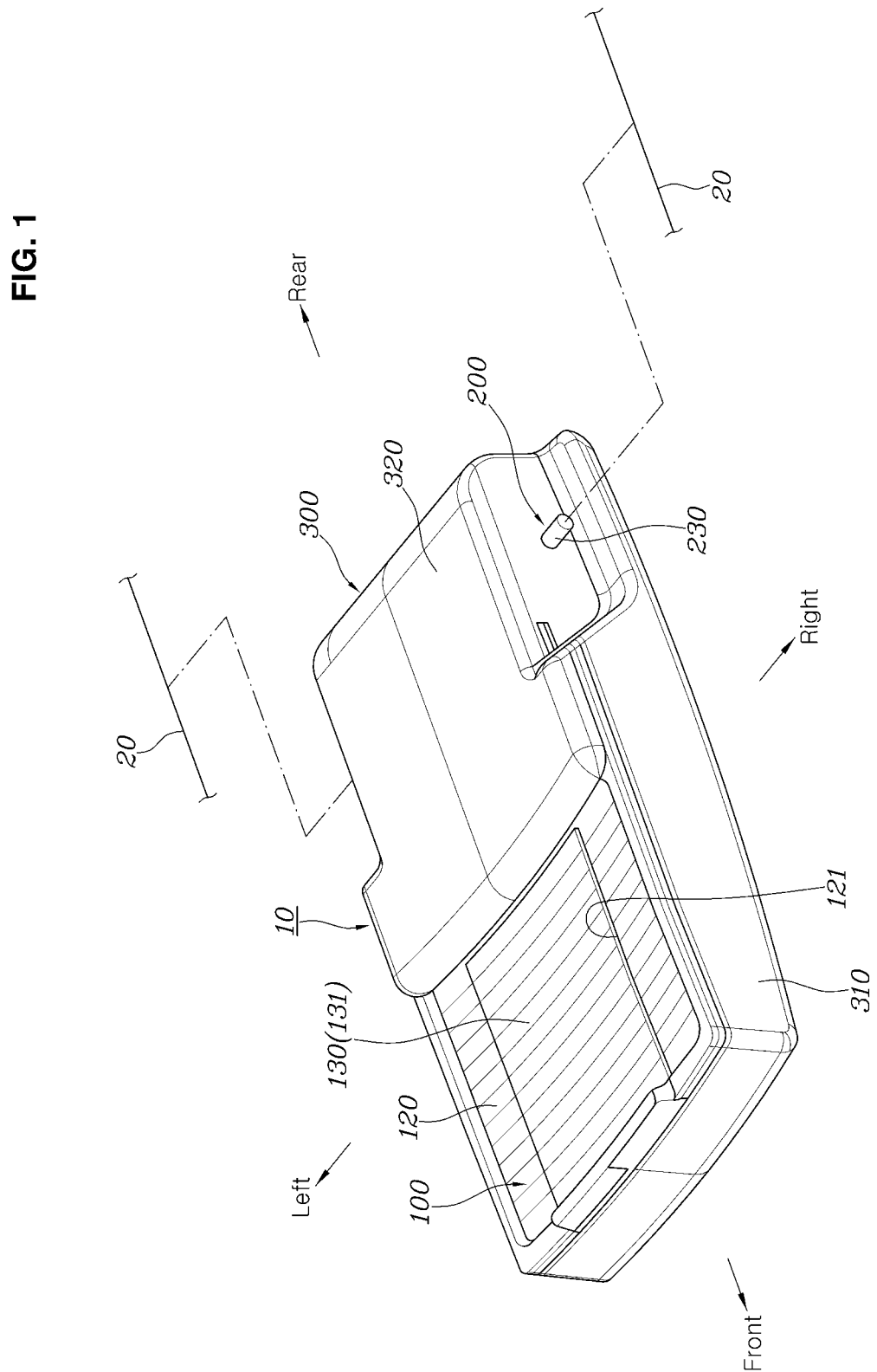
FIG. 1 is a perspective of an armrest device for a vehicle according to an embodiment of the present disclosure.
Figure 2:
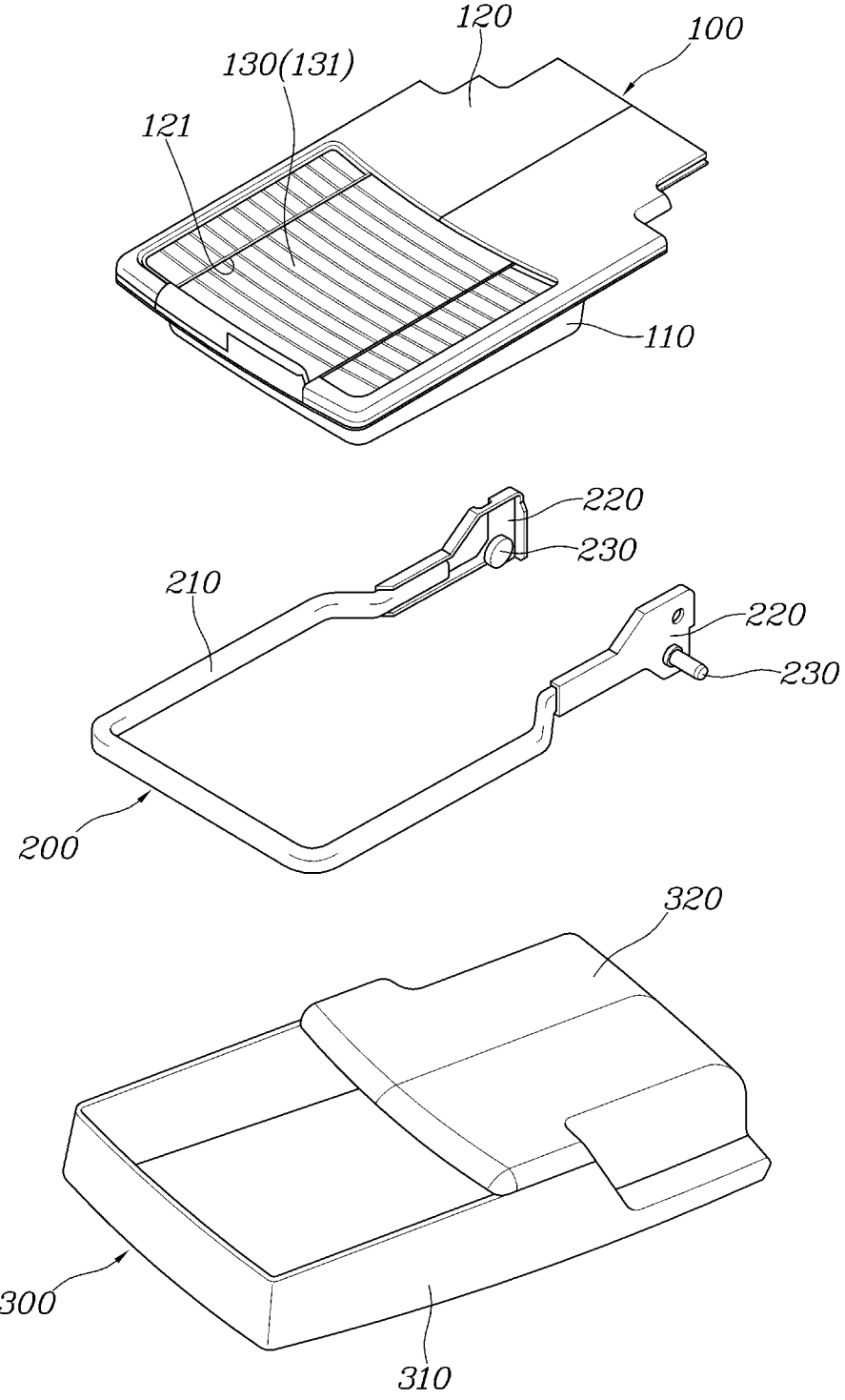
FIG. 2 is an exploded view corresponding to FIG. 1.
Figure 3:
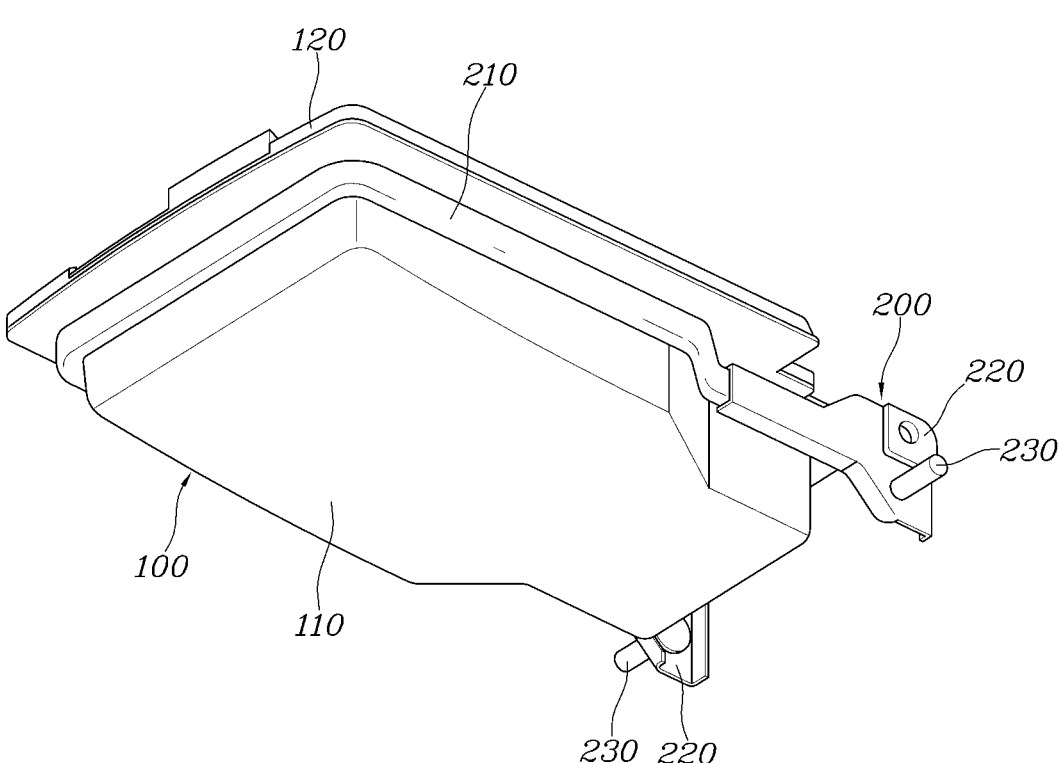
FIG. 3 is a bottom view showing a state in which a tray module and a frame module according to the embodiment of the present disclosure are coupled to each other.
Figure 4:
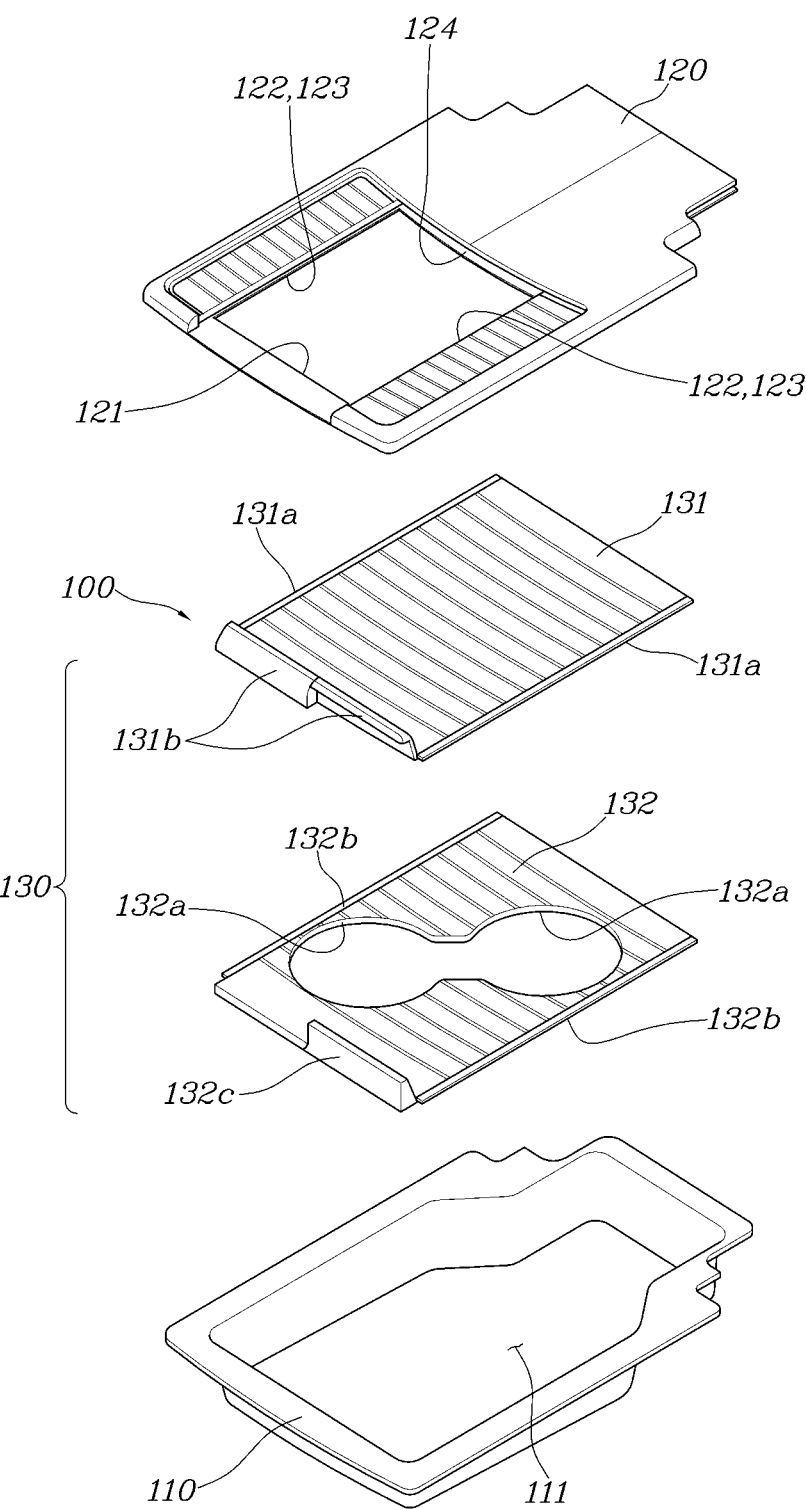
FIG. 4 is an exploded view of the tray module according to the embodiment of the present disclosure.
Figure 5:
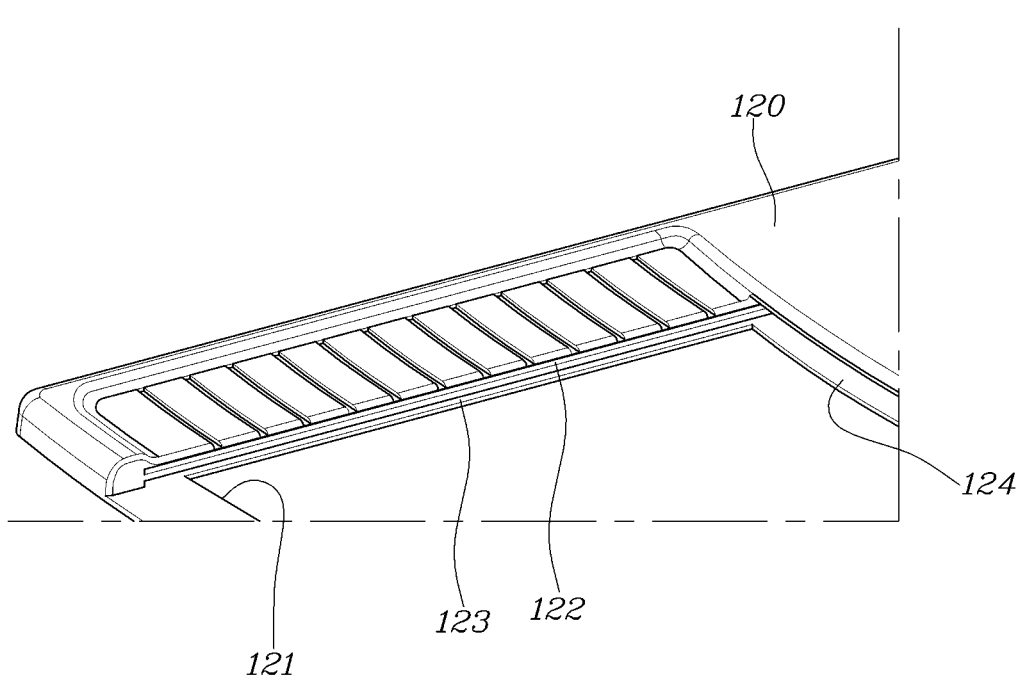
FIG. 5 is an enlarged view of a tray cover according to the embodiment of the present disclosure.
Figure 6:
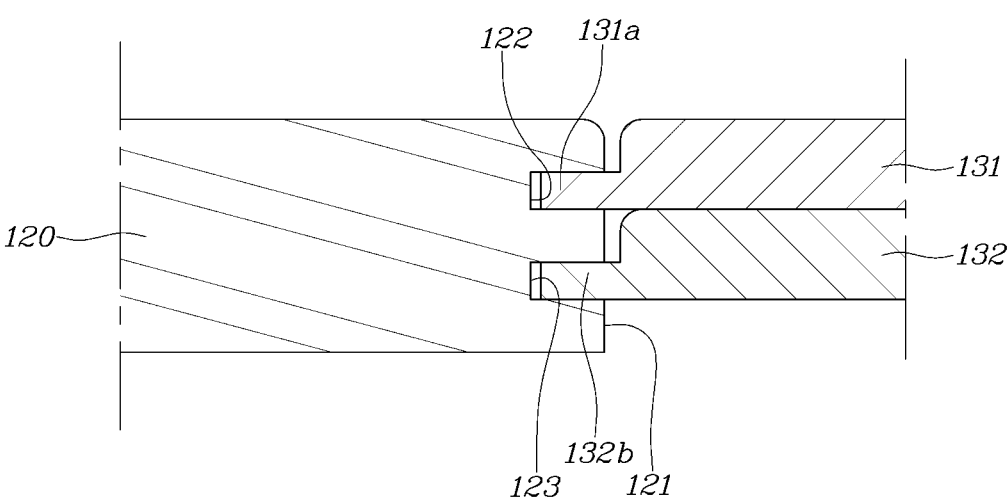
FIG. 6 is a sectional view of coupling portions of first and second guide rails and first and second slide covers according to the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings, and the same or similar elements are designated by the same reference numerals regardless of the numerals in the drawings and redundant description thereof will be omitted.

In describing the present disclosure, moreover, a detailed description will be omitted when a specific description of publicly known technologies to which the disclosure pertains is judged to obscure the gist of the present disclosure.

In addition, it should be noted that the accompanying drawings are merely illustrated to easily explain the spirit of the disclosure, and therefore, should not be construed as limiting the spirit of the disclosure to the accompanying drawings. On the contrary, the disclosure is to cover all modifications, equivalents, and alternatives falling within the spirit and scope of the disclosure as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It will be understood that, when one element is referred to as being "connected to" or "coupled to" another element, one element may be "connected to" or "coupled to" another element via a further element although one element may be directly connected to or directly coupled to another element.

On the other hand, it will be understood that, when an element is referred to as being "directly connected to" or "directly coupled to" another element, there is no intervening element present.

Unless clearly used otherwise, singular expressions include a plural meaning.

In addition, the term "unit" or "control unit" used in specific terminology such as a motor control unit (MCU), a hybrid control unit (HCU), or the like is only a term widely used for designation of a controller for controlling a particular function of a vehicle and, as such, does not mean a generic functional unit.

The controller may include a communication device configured to communicate with another controller or a sensor for control of a function to be performed thereby, a memory configured to store an operating system, logic commands, input/output information, etc., and at least one processor configured to execute discrimination, calculation, determination, etc. required for control of the function to be performed.

Hereinafter, an armrest device for a vehicle according to an exemplary embodiment of the present disclosure will be described with reference to the accompanying drawings.

As shown in FIGS. 1 to 12, an armrest device for a vehicle according to an embodiment of the present disclosure, which is designated by reference numeral "10", includes a tray module 100 having a box structure, to provide a cup holder function, an article storage function, and a table function, a frame module 200 configured to enclose a periphery of the tray module 100 and coupled to a rear seat 20 at opposite ends thereof, and a cover module 300 configured to cover the tray module 100.

The armrest device 10 according to the embodiment of the present disclosure may be rotatably installed at the rear seat 20 of the vehicle, and may basically provide an arm rest function for allowing a passenger to put an arm on an armrest, a cup holder function, an article storage function, and a table function for allowing an article to be laid on the armrest, for use thereof, in a state in which an upper surface of the armrest has a large area.

The tray module 100 includes a tray 110 provided with a storage space 111, a tray cover 120 coupled to the tray 110 and formed with a connecting window 121 connected to the storage space 111, and a plurality of slide covers 130 slidably coupled to the tray cover 120 and configured to implement one of complete opening, partial opening, or closing of the connecting window 121 in accordance with slide movement thereof and to provide a cup holder function upon partially opening the connecting window 121.

The tray 110 has a box shape open at an upper side thereof, and an inner space of the tray 110 becomes the storage space 111 for storage of articles.

The tray cover 120 is coupled to an upper surface of the tray 110, to close an opening of the tray 110 using a portion thereof except for the connecting window 121. The tray cover 120 also connects the storage space 111 of the tray 110 to an exterior thereof through the connecting window 121.

The slide cover 130 includes a first slide cover 131 and a second slide cover 132 installed in a state of vertically overlapping each other.

In accordance with the embodiment of the present disclosure, the first slide cover 131 is installed to be overlapped with the second slide cover 132 over the second slide cover 132.

The first slide cover 131 has no hole extending vertically therethrough and, as such, functions to completely close the connecting window 121 in a state of moving forwards in a full stroke.

A plurality of cup holder holes 132a is formed at the second slide cover 132, to extend vertically through the second slide cover 132. When the cup holder holes 132a are exposed when the second slide cover 132 moves forwards in a full stroke, a passenger may insert cups into the cup holder holes 132a, for use thereof. Thus, the second slide cover 132 may provide a cup holder function.

The cup holder holes 132a may have a circular shape or a quadrangular shape, or may have a polygonal shape, if necessary.

When both the first slide cover 131 and the second slide cover 132 move rearwards in a full stroke, the connecting window 121 of the tray cover 120 becomes completely opened.

A first guide rail 122 and a second guide rail 123 are formed at the tray cover 120 along lateral edges of the connecting window 120, to extend forwards and rearwards while vertically overlapping each other.

In accordance with the embodiment of the present disclosure, the first guide rail 122 and the second guide rail 123 are formed such that the first guide rail 122 is disposed over the second guide rail 123.

A first guide protrusion 131a formed at a side surface of the first slide cover 131 is inserted into the first guide rail 122, to be movable forwards and rearwards. A second guide protrusion 132b formed at a side surface of the second slide cover 132 is inserted into the second guide rail 123, to be movable forwards and rearwards.

Each of the first guide rail 122 and the second guide rail 132 is formed at left and right lateral edges of the connecting window 121, each of the first guide protrusion 131a is formed at left and right side surfaces of the first slide cover 131, and each of the second guide protrusion 132b is formed at left and right side surfaces of the second slide cover 132. Accordingly, the first slide cover 131 and the second slide cover 132 may more stably move forwards and rearwards through left and right guide supports.

A first manipulation protrusion 131b is formed at a front end of the first slide cover 311, to protrude upwards. A second manipulation protrusion 132c is formed at a front end of the second slide cover 132, to protrude upwards.

The first manipulation protrusion 131b and the second manipulation protrusion 132c function as handles to be gripped by the fingers of the user, for movement of the first slide cover 131 and the second slide cover 132, respectively.

In accordance with the embodiment of the present disclosure, the first manipulation protrusion 131b and the second manipulation protrusion 132c are formed to have different lateral lengths, respectively.

That is, the second manipulation protrusion 132c is formed to have a smaller lateral length than that of the first manipulation protrusion 131b.

Since the first slide cover 131 and the second slide cover 132 are installed to overlap each other such that the first slide cover 131 is disposed at an upper side, and the second slide cover 132 is disposed at a lower side, the second manipulation protrusion 132c has a structure contacting only a portion of the first manipulation protrusion 131b under the first manipulation protrusion 131b.

Figure 7:
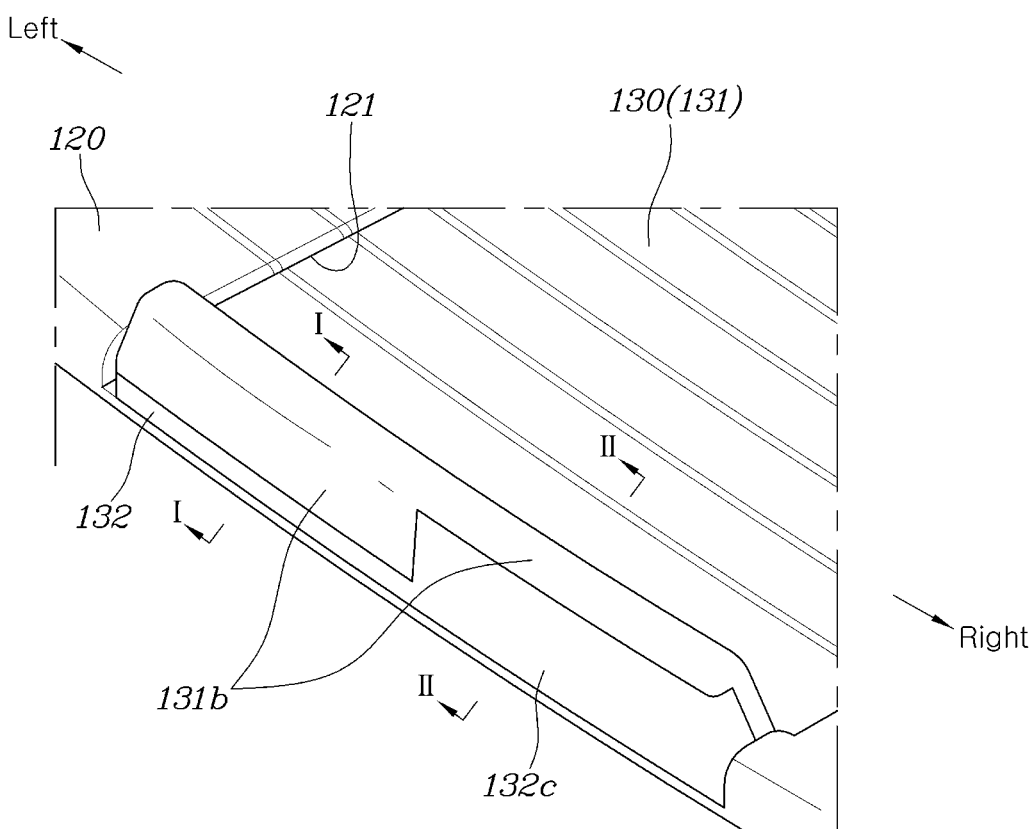
FIG. 7 is an enlarged view of a slide cover, explaining first and second manipulation protrusions according to the embodiment of the present disclosure.
Figure 8:
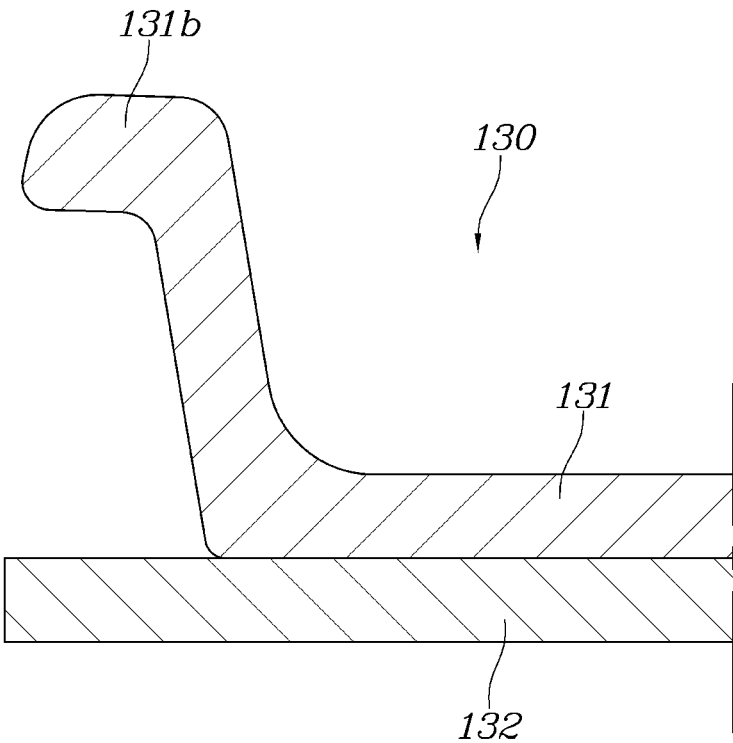
FIGS. 8 and 9 are cross-sectional views taken along lines I-I and II-II as displayed in FIG. 7, respectively.
Figure 9:
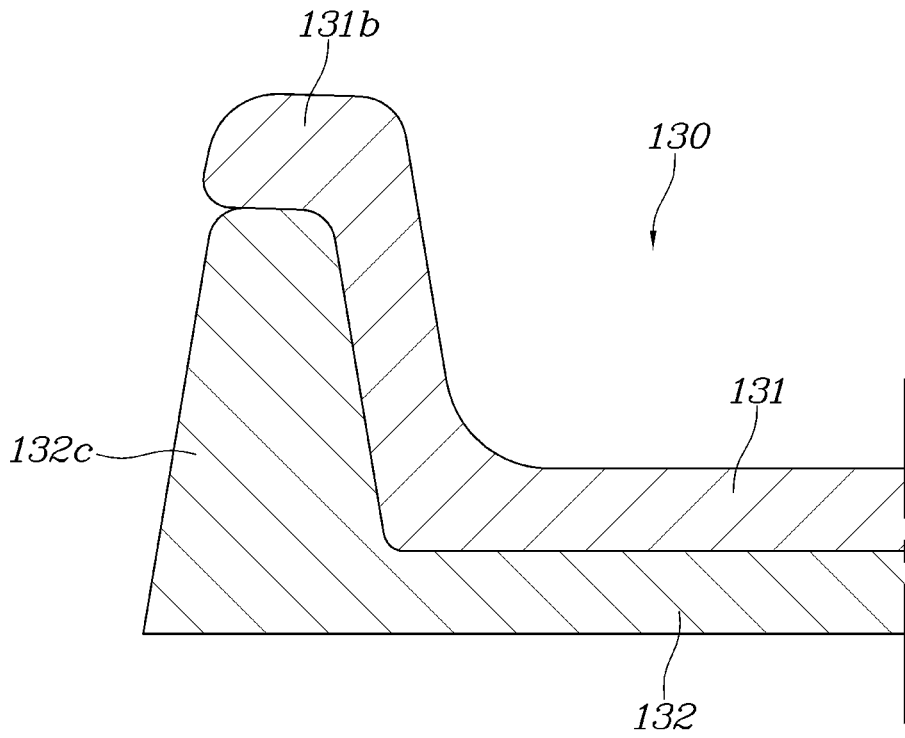

Referring to FIGS. 7 to 9, a portion of the first manipulation protrusion 131b is disposed at a left side with reference to a middle point of the first slide cover 131 in a lateral direction, a remaining portion of the first manipulation protrusion 131b is disposed at a right side with reference to the middle point of the first slide cover 131. The second manipulation protrusion 131c is disposed under the remaining portion of the first manipulation protrusion 131b and as such, a structure in which the first manipulation protrusion 131b and the second manipulation protrusion 131c overlap each other while contacting each other is formed.

In accordance with the embodiment of the present disclosure, a cover accommodating space 124 is provided at the tray cover 120, to accommodate the first slide cover 131 and the second slide cover 132 moved rearwards.

The cover accommodating space 124 is connected to a rear edge of the connecting window 121 and, as such, accommodates therein the first slide cover 131 and the second slide cover 132 moved rearwards.

In accordance with the embodiment of the present disclosure, the frame module 200 may include a main pipe 210 configured to enclose a front portion and left and right edges of the tray module 100, to support the tray module 100, hinge brackets 220 respectively coupled to opposite ends of the main pipe 210, and hinge pins 230 coupled to the rear seat 20 while extending through the hinge brackets 220, respectively.

The main pipe 210 and the hinge brackets 220 may be coupled to each other through welding. The hinge pins 230 may be fixedly coupled to the rear seat 20 while extending through the hinge brackets 220, respectively. In this case, the main pipe 210 and the hinge brackets 220 may pivot about the hinge pins 230 and, as such, the frame module 200 may be coupled to the rear seat 20 in the form of a pivoting structure.

Conventional frame modules have drawbacks of an increase in weight and an increase in costs caused by a great number of elements because such a conventional frame module is configured through inclusion of a sub-wire and a lower-end wire coupled to the main pipe 210 in addition to the main pipe 210, the hinge brackets 220, and the hinge pins 230. However, the frame module 200 according to the embodiment of the present disclosure is configured without use of a sub-wire and a lower-end wire and, as such, has advantages of a reduction in the number of elements, a reduction in weight, and a reduction in costs.

In accordance with the embodiment of the present disclosure, the cover module 300 may include a cover part 310 configured to cover a lower portion of the tray module 100 and front, rear, left and right edges of the tray module 100 as well as the frame module 200, and a cushion part 320 connected to a rear portion of an upper end of the cover part 310, to provide cushioning to the passenger when the passenger puts an arm on the armrest.

The cover part 310 covers a large portion of the tray module 100, to protect the tray module 100. In this regard, it is preferred that the cover part 310 be made of a plastic material having hardness, without being limited thereto.

The cushion part 320 is connected to the upper end of the cover part 310, to cover the rear portion of the upper end of the cover part 310, except for a portion of the upper end of the cover part 310 where the slide cover 130 is installed. The cushion part 320 is a part on which the passenger may put an arm. Accordingly, it is preferred that the cushion part 320 be made of a material capable of providing cushioning to the passenger.

Figure 12:
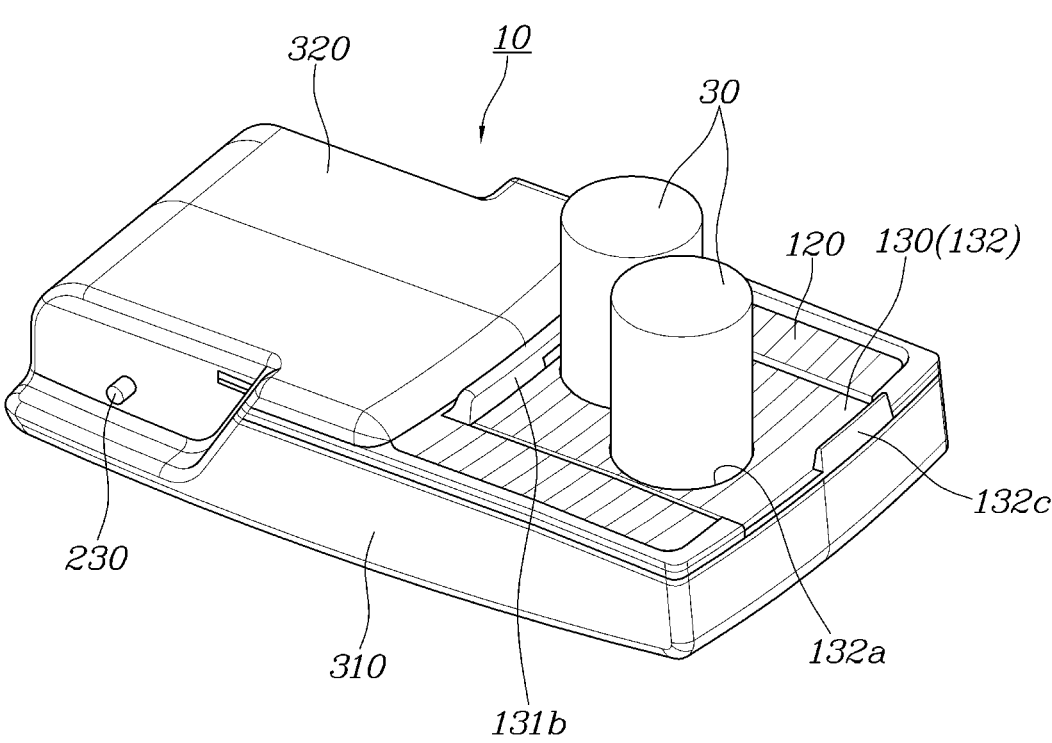

When the passenger moves the first slide cover 131 in a rearward direction in a state in which the connecting window 121 is closed by the first slide cover 131, only the first slide cover 131 is moved in the rearward direction, and the second slide cover 132 is not moved in the rearward direction, as shown in FIG. 12.

Accordingly, the connecting window 121 is partially opened by the cup holder hole 132a of the second slide cover 132 and, as such, the passenger may insert a cup 30 into the cup holder hole 132a, for use thereof. Thus, a cup holder function may be implemented by the second slide cover 132.

Figure 13:
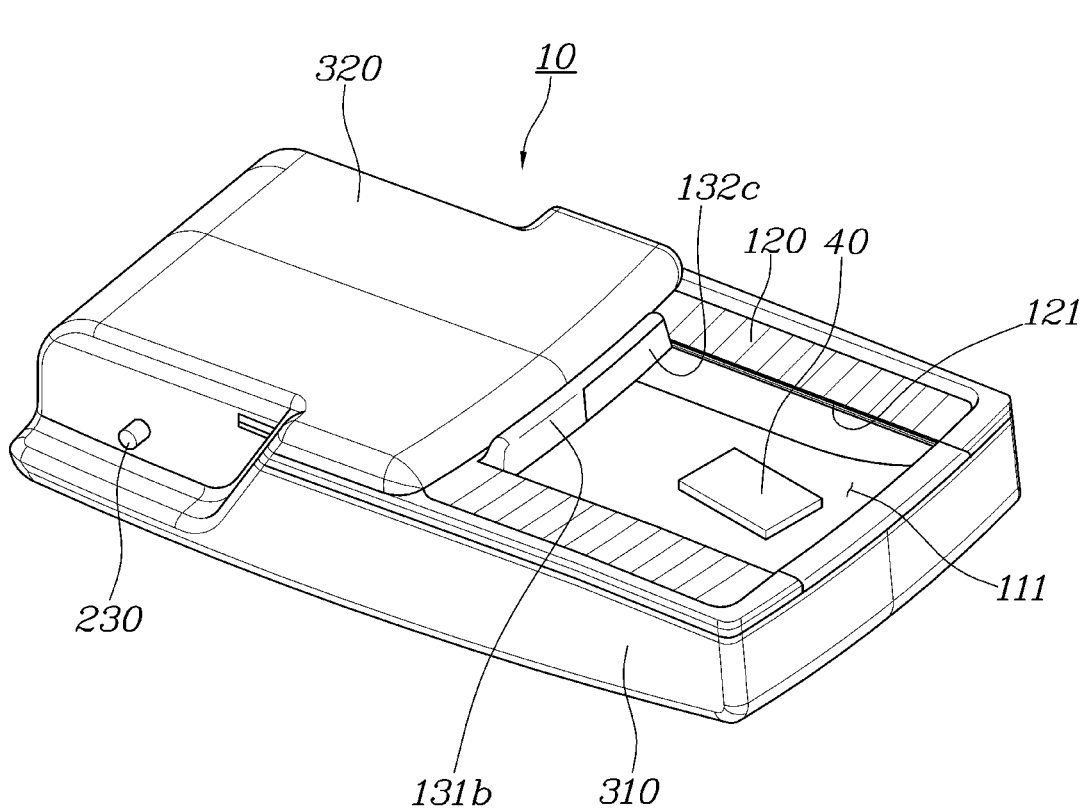

In addition, when the passenger moves the second slide cover 132 in the rearward direction in a state in which the connecting window 121 is closed by the first slide cover 131, the first slide cover 131 is moved in the rearward direction, together with the second slide cover 132, as shown in FIG. 13. Accordingly, the connecting window 121 is completely opened and, as such, it may be possible to store an article 40 in the storage space 110 of the tray 110 through the opened connecting window 121. Thus, an article storage function may be implemented.

When the passenger moves the second slide cover 132 in a forward direction in a state in which the connecting window 121 is completely opened in accordance with rearward movement of both the first slide cover 131 and the second slide cover 132, as shown in FIG. 13, only the second slide cover 132 is exposed in accordance with forward movement thereof, and the first slide cover 131 is still maintained at a rearward position thereof because the first slide cover 131 is not moved in the forward direction, as shown in FIG. 12. In this state, accordingly, the cup holder function may still be implemented.

In addition, when the passenger moves the first slide cover 131 in a forward direction in a state in which the connecting window 121 is completely opened in accordance with rear-ward movement of both the first slide cover 131 and the second slide cover 132, as shown in FIG. 13, the second slide cover 132 is moved in the forward direction, together with the first slide cover 131. Accordingly, the connecting window 121 is completely closed, as shown in FIG. 1 and FIGS. 10 and 11.

In a state in which the connecting window 121 is com-pletely closed by the first slide cover 131, the upper surface of the armrest has a closed large area and, as such, a table function may be implemented.

Figure 10:
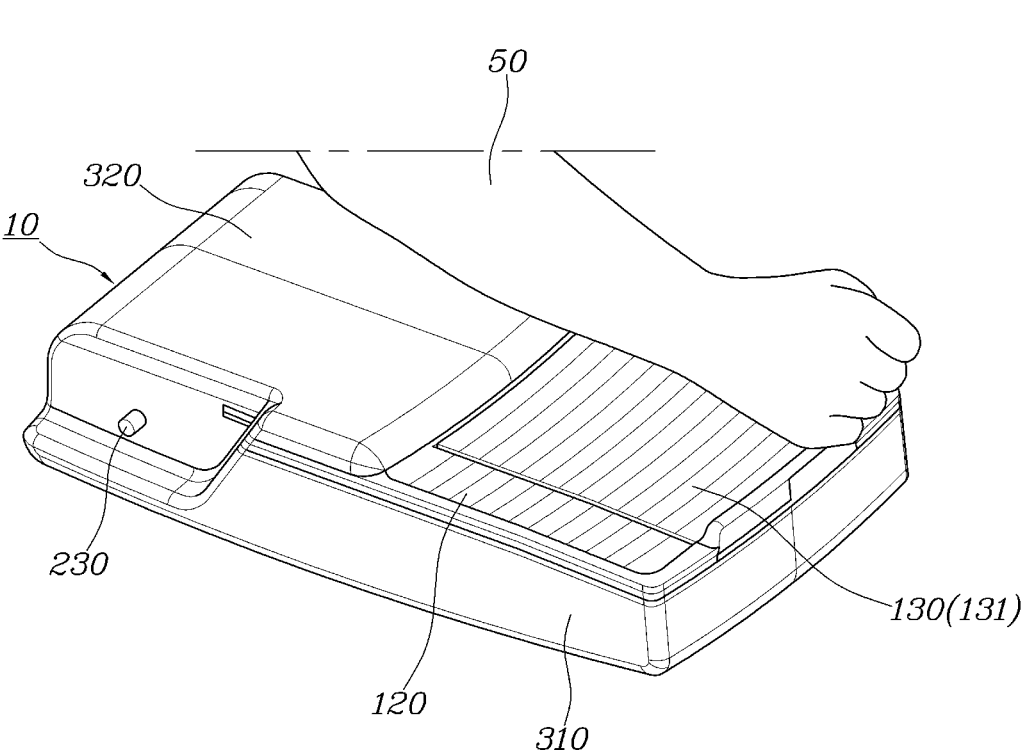
FIGS. 10 to 13 are views explaining an arm rest function, a table function, a cup holder function, and an article storage function according to the embodiment of the present disclosure, respectively.

In the state in which the connecting window 121 is completely closed by the first slide cover 131, the passenger may put an arm 50 on the armrest using the cushion part 320 and the first slide cover 131, as shown in FIG. 10, and, as such, a passenger arm rest function may be implemented. In particular, an area capable of enabling the arm 50 to be put thereon is increased by the first slide cover 131. Accordingly, the passenger arm rest function is further enhanced and, as such, an enhancement in ride comfort may be achieved.

Figure 11:
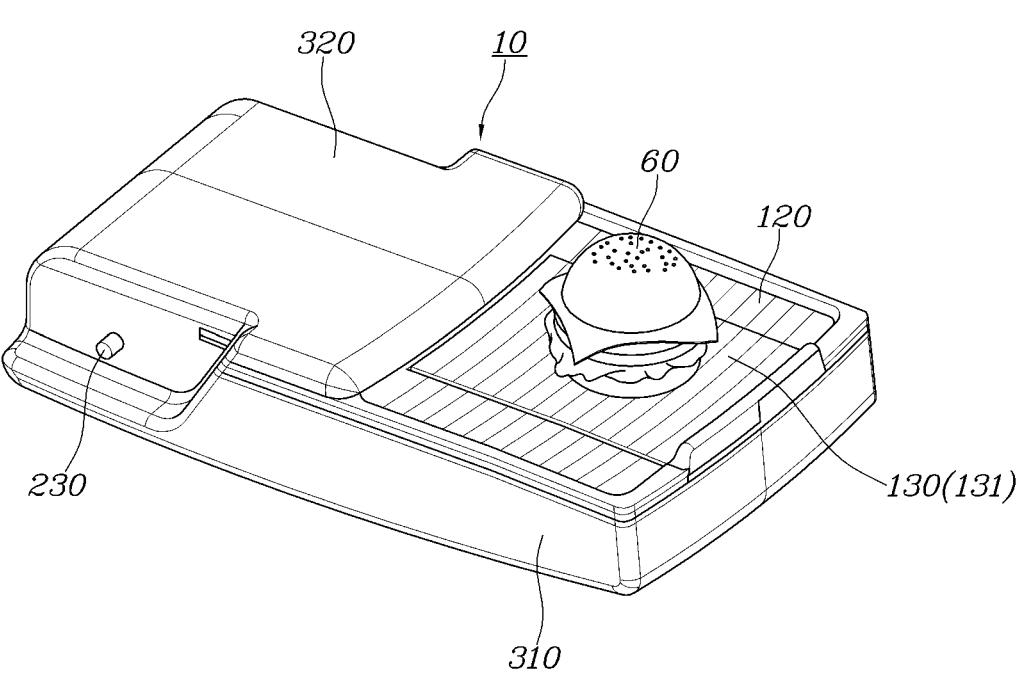

In addition, since a large-area table function may be implemented in the state in which the connecting window 121 is completely closed by the first slide cover 131, the passenger may put various articles or food 60 on the first slide cover 131, for use thereof, as shown in FIG. 11. Accordingly, there is an advantage in that an enhancement in convenience and an enhancement in marketability may be achieved.

As described above, the armrest device according to the embodiment of the present disclosure includes the first slide cover 311, which has a structure having no vertically-extending hole, and the second slide cover 312 formed with the cup holder hole 132a, and, as such, may implement an arm rest function enabling the passenger to put an arm thereon, a cup holder function, an article storage function, and a table function through movement of the first slide cover 311 and the second slide cover 312. Accordingly, the armrest device according to the embodiment of the present disclosure has advantages in that an enhancement in use convenience and an enhancement in marketability may be achieved.

In addition, the armrest device according to the embodi-ment of the present disclosure is configured to provide an increased article storage space through use of the large storage space 111 of the tray 110, irrespective of use of the cup holder function. Accordingly, there is an advantage in that an enhancement in marketability may be achieved.

Furthermore, the armrest device according to the embodi-ment of the present disclosure has an advantage in that a reduction in weight and a reduction in costs may be achieved through a reduction in the number of elements of the frame module 200.

Although embodiments of the present disclosure have been described in detail with reference to the accompanying drawings, the present disclosure is not limited to the embodi-ments, and various changes may be made in the embodi-ments without departing from the principles and spirit of the disclosure. Therefore, the disclosed embodiments are to be considered in all respects as illustrative and not restrictive. The scope of the disclosure is indicated by the appended claims rather than the foregoing description, and all changes that come within the meaning and range of equivalency of the disclosure are intended to be embraced therein.

What is claimed is:

1. An armrest device for a vehicle, the armrest device comprising:
    a tray module configured to provide a cup holder function, an article storage function, and a table function;
    a frame module configured to enclose a periphery of the tray module and coupled to a rear seat of the vehicle; and
    a cover module configured to cover the tray module,
    wherein the tray module comprises:
    a tray provided with a storage space;
    a tray cover coupled to the tray and formed with a connecting window connected to the storage space; and
    a plurality of slide covers slidably coupled to the tray cover and configured to slide relative to the connecting window into one of a completely open position, a partially open position, or a closed position of the connecting window, such that in the partially open position, the plurality of slide covers is configured to serve as a cup holder.

2. The armrest device according to claim 1, wherein the slide cover comprises:
    a first slide cover having no hole extending vertically through the first slide cover, to completely cover the connecting window; and
    a second slide cover formed with a cup holder hole, to provide a cup holder function.

3. The armrest device according to claim 2, wherein:
    the first slide cover is installed to be overlapped with the second slide cover over the second slide cover;
    a first guide rail and a second guide rail are formed at the tray cover along lateral edges of the connecting win-dow, to extend forwards and rearwards while vertically overlapping each other;
    a first guide protrusion formed at a side surface of the first slide cover is inserted into the first guide rail; and
    a second guide protrusion formed at a side surface of the second slide cover is inserted into the second guide rail.

4. The armrest device according to claim 2, wherein:
    a first manipulation protrusion is formed at a front end of the first slide cover, to protrude upwards;
    a second manipulation protrusion is formed at a front end of the second slide cover, to protrude upwards; and
    the second manipulation protrusion is formed to have a smaller lateral length than a lateral length of the first manipulation protrusion, to overlap with only a portion of the first manipulation protrusion under the first manipulation protrusion.

5. The armrest device according to claim 2, wherein, when the first slide cover is moved in a rearward direction under a condition that the connecting window is closed by the first slide cover, only the first slide cover is moved in the rearward direction, the second slide cover is exposed with-out being moved in the rearward direction, and the connect-ing window is partially opened by the cup holder hole of the second slide cover, to enable a cup holder function to be implemented by the second slide cover.

6. The armrest device according to claim 2, wherein, when the second slide cover is moved in a rearward direction under a condition that the connecting window is closed by the first slide cover, the first slide cover is moved in the rearward direction, together with the second slide cover, to completely open the connecting window and to enable implementation of a function for storing an article in the storage space of the tray through the opened connecting window.

7. The armrest device according to claim 2, wherein, when the first slide cover is moved in a forward direction under a condition that the connecting window is completely opened in accordance with rearward movement of both the first slide cover and the second slide cover, the second slide cover is moved in the forward direction, together with the first slide cover, to completely close the connecting window.

8. The armrest device according to claim 2, wherein, when the second slide cover is moved in a forward direction under a condition that the connecting window is completely opened in accordance with rearward movement of both the first slide cover and the second slide cover, only the second slide cover is exposed in accordance with forward movement thereof, and the connecting window is partially opened by the cup holder hole of the second slide cover, to enable a cup holder function to be implemented by the second slide cover.

9. The armrest device according to claim 2, wherein an upper surface of the armrest device has a large area under a condition that the connecting window is completely closed by the first slide cover, to enable implementation of a table function.

10. The armrest device according to claim 2, wherein the tray cover is provided with a cover accommodating space configured to accommodate the first slide cover and the second slide cover.

11. The armrest device according to claim 1, wherein the frame module is coupled to opposite ends of the rear seat.

12. The armrest device according to claim 1, wherein the frame module comprises:

a main pipe configured to enclose the periphery of the tray module, to support the tray module;

hinge brackets respectively coupled to opposite ends of the main pipe; and hinge pins coupled to the rear seat while extending through the hinge brackets, respectively.

13. The armrest device according to claim 1, wherein the cover module comprises:

a cover part configured to cover a lower portion of the tray module and front, rear, left and right edges of the tray module as well as the frame module; and a cushion part connected to a rear portion of an upper end of the cover part, to provide cushioning to a passenger when the passenger puts an arm on thereon.

14. The armrest device according to claim 1, wherein the tray module has a box structure.

15. A vehicle seat comprising the armrest device according to claim 1.

16. A vehicle comprising the armrest device according to claim 1.

* * * * *